United States Patent [19]

Klose et al.

[11] Patent Number: 5,082,519

[45] Date of Patent: Jan. 21, 1992

[54] TIRE CARCASS TRANSFER ROBOT

[75] Inventors: Karl W. Klose, Findlay; Gary H. Benjamin, Kenton, both of Ohio

[73] Assignee: Cooper Tire & Rubber Company, Findlay, Ohio

[21] Appl. No.: 529,065

[22] Filed: May 25, 1990

[51] Int. Cl.$^5$ .......................... B29D 30/08; B65H 9/12
[52] U.S. Cl. .................................. 156/396; 156/126; 156/406.2; 414/225; 901/17
[58] Field of Search ...................... 156/396, 406.2, 126; 414/730, 910, 73 S, 744.4, 225, 741; 901/1, 17, 6

[56] References Cited

U.S. PATENT DOCUMENTS 4,423,998  1/1984  Inaba et al. ...................... 414/730
4,894,103  1/1990  Bailey ............................... 136/396

Primary Examiner—Michael W. Ball
Assistant Examiner—Francis Lorin
Attorney, Agent, or Firm—Joseph G. Nauman

[57] ABSTRACT

A transfer robot comprises a carriage mounted headstock assembly, a main support disk mounted to the rotatable spindle of a headstock, an extention slide mounted to the support disk for motion transverse to the spindle, and a carrying fixture mounted to the outer end of the slide and having adjustable sets of spaced apart gripping arms for gripping and carrying a cylindrical tire carcass. A counterweight on the disk offsets the outboard weight of the extended slide and carrying fixture, and a carcass carried thereon, on the headstock spindle and its bearings. The robot is powered by programmable devices which sequence its operation to grasp and carry a carcass by its bead areas from a carcass supply station, in an arc, into alignment with the axis of a tire building drum, then the carcass is moved axially of that drum and located around it, after which the gripping arms release and retract, and the fixture is moved to a parked position.

3 Claims, 2 Drawing Sheets

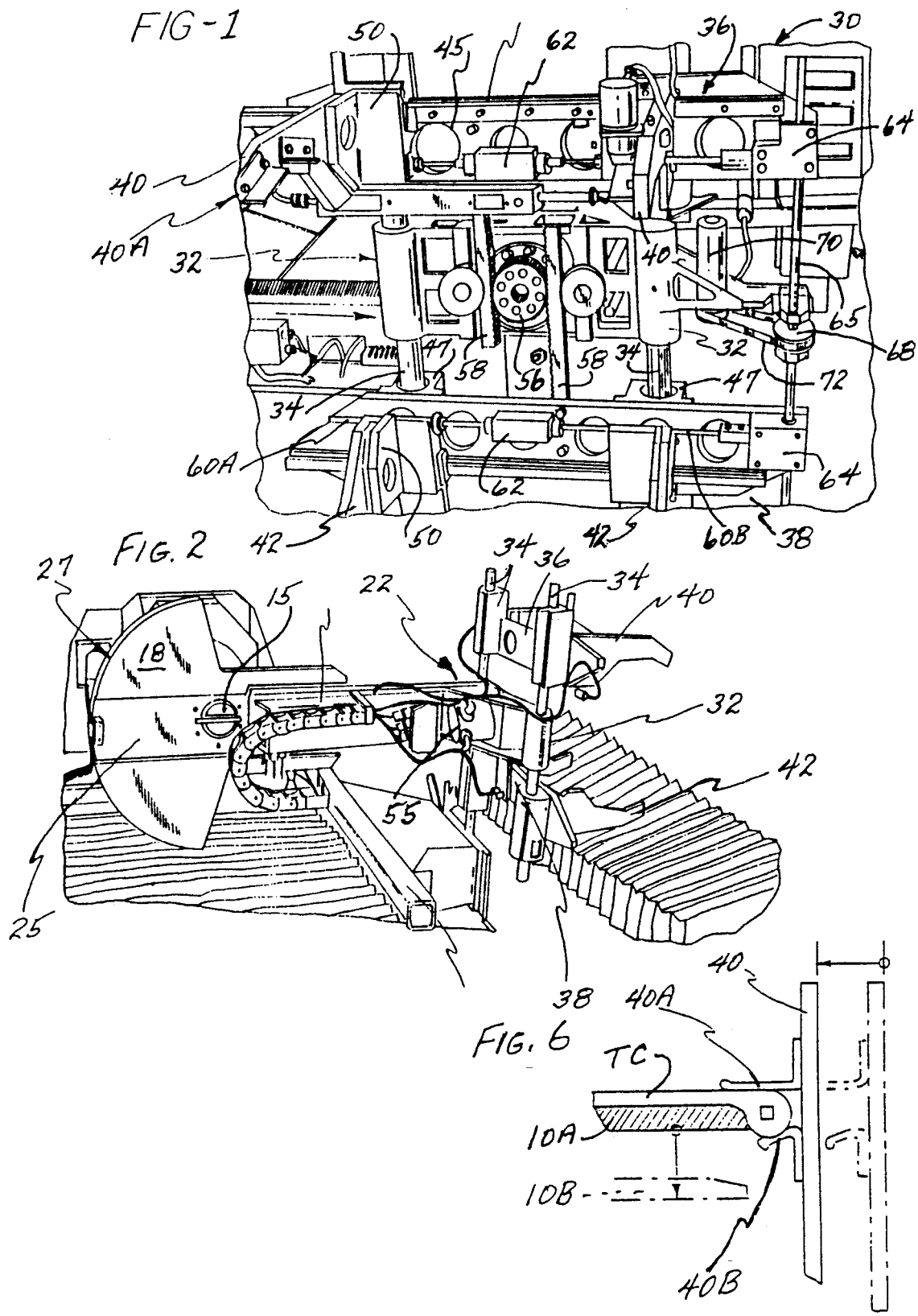

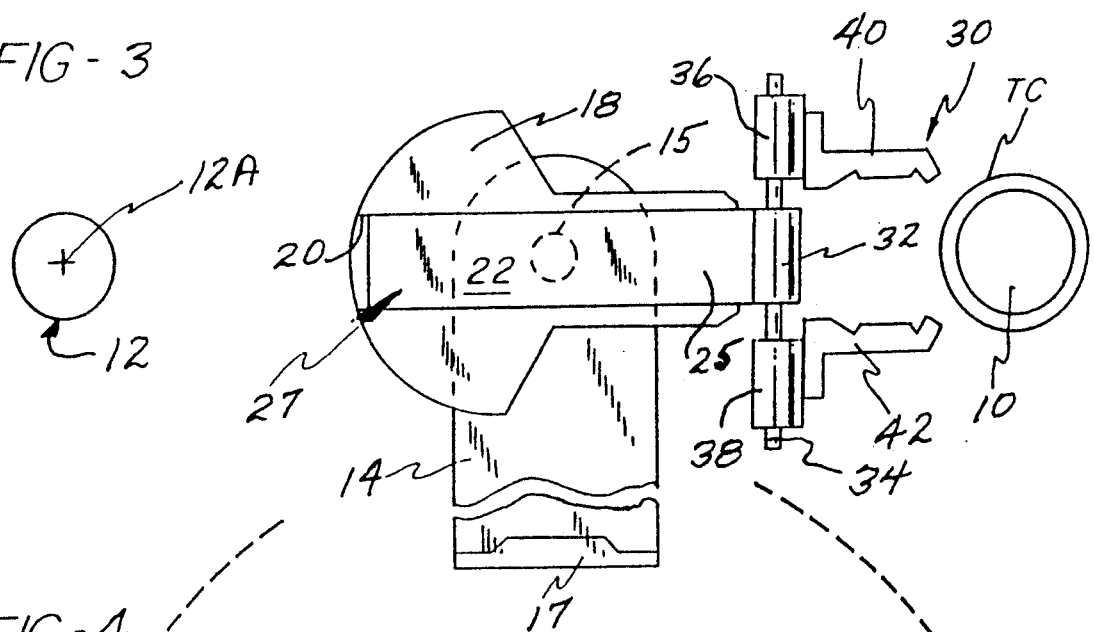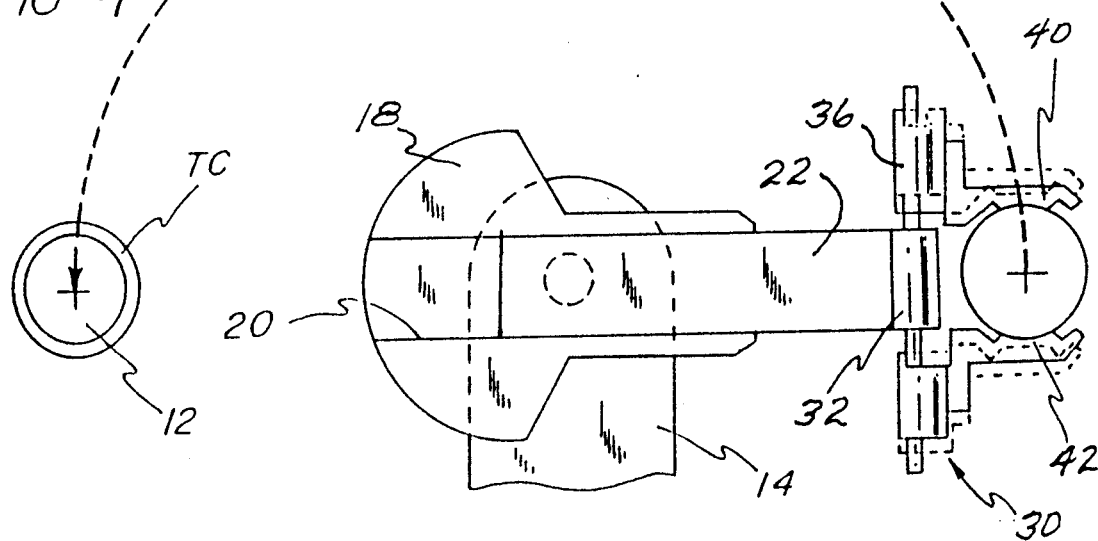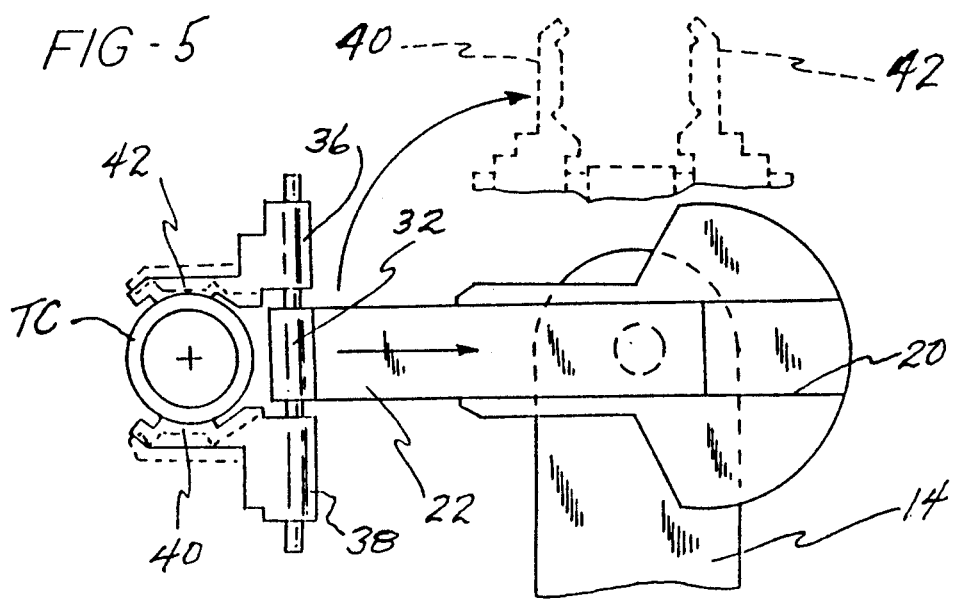

TIRE CARCASS TRANSFER ROBOT

BACKGROUND OF THE INVENTION

This invention relates to an apparatus for the assembly of radial tire components, and more particularly, to an automatic first stage carcass transfer apparatus which can respond to the completion of an automatically built first stage carcass, and transfer such carcass into position on an assembly drum for assembly with a belt-tread stock package, or second stage assembly. In this final two-stage assembly step the belt-tread stock package is attached to and consolidated with a carcass which is previously assembled on a first stage assembly machine.

When applying the two-stage method of assembling a modern radial tire, it is common to use a first stage carcass assembly machine and a second stage machine on which the carcass from the first stage is chucked by its beads and then transformed from a cylinder into a toroidal shape, at which time the belt-tread stock package is added to the carcass, and the assembly is then consolidated by stitching the two tacky subassemblies together.

The basic elements of a modern radial ply pneumatic tire consist of an inner liner, one or more plies, sidewalls, beads, fillers and other bead reinforcements, all of which, when properly assembled, form an assembly called a first stage carcass, as well as a belt-tread stock assembly comprising one or more belts incorporating steel cord or other suitable cord materials and a length of tread stock combined to form a belt-tread stock package or second stage assembly. The first stage carcass and the belt-tread stock package are then combined into a green tire, which is subsequently molded and cured in a vulcanizer.

One form of apparatus for combining the two assemblies is described in U.S. Pat. No. 4,402,782 issued Sept. 6, 1983, to the assignee of this application. The two major assemblies are produced on two distinct and separate types of apparatus which are then combined into a so-called green tire.

The carcass is initially cylindrical and consists of one or more body plies of rubber coated cord, a pair of axially spaced parallel bead rings, layers of the ply material which encompass the bead rings, and side wall stock material. These tire elements are typically assembled in a manually operated apparatus, such as disclosed in U.S. Pat. No. 4,333,788, and consolidated on a cylindrical carcass building drum into the shape of a cylinder. Then the cylindrical carcass is loaded, in most cases manually, onto a tire building or assembly drum (FIGS. 18 and 19 of said U.S. Pat. No. 4,402,782) and re-shaped into a toroidal carcass.

The second assembly is prepared by consolidating one or more relatively nonextensible belts, of suitable cord (e.g. steel wire in the case of a steel belted tire) incorporated into uncured rubber stock, with a band of tread stock. Then the belt/tread stock assembly is consolidated with the toroidal carcass, producing a finished green radial tire carcass which is removed from the building machine and placed in a suitable mold for final shaping and vulcanization of the various rubber components, thereby forming a completed cured tire.

The removal of the carcass from the cylindrical carcass building drum is a manual operation, carried out by the operator of the first stage or carcass assembly apparatus, while the loading of the carcass onto the tire assembly drum of the second stage machine is also a manual operation, carried out by the operator of that machine.

These operations, however, at the present time do not follow each other in quick succession; carcasses are always placed onto carcass handling and storage devices, and they are kept there until needed in scheduling the work of the second stage equipment. Obviously, carcasses waiting for further processing must be handled, stored, and carted about; such operations are costly due to the additional labor and large amount of floor space requirements, but above all, the handling and storage of carcasses adds many uncontrollable and undesirable process variables to the product, such as exposure to touching by human hands and associated exposure to dirt, grease, perspiration, remnants of soap or detergents or skin creams. In addition, there is an undetermined exposure to airborne particles which deposit on the outer surface of the carcasses. The unknown duration of that exposure, anywhere from one hour to three or four days (on long weekends), results in undesirable distortions and carcass deformations.

Thus, it is highly desirable to minimize the various problems, as recited, by eliminating the various manual carcass removal, handling, and reloading operations, and to mechanize these functions.

SUMMARY OF THE INVENTION

The present invention relates to a transfer apparatus, preferably in the form of a robot that is capable of following program commands, which carries the cylindrical carcass from a carcass supply position, for example from a carcass building drum, to a tire building drum on which the carcass is modified to toroidal shape.

While the transfer robot is designed specifically for inclusion as part of an integrated tire building system, the robot has other utility in tire manufacturing methods, with other equipment. Thus, the robot is described in connection with its use in moving a cylindrical first stage tire carcass between a carcass supply position, where a supply of carcasses is available, and the building drum of a tire building machine which re-shapes the carcass and then combines a belt-tread stock assembly with the carcass to make a completed green tire. However, it should be understood that the invention is not limited to use with an automated carcass building apparatus, or a specific tire assembly drum.

The transfer robot comprises a carriage mounted headstock assembly, a main support rotatably mounted to the head stock assembly and connected for selective rotation by the headstock spindle, an extension slide mounted to the main support, and a carrying fixture mounted to the extension slide and having adjustable sets of spaced apart gripping arms for gripping and carrying the cylindrical carcass. Preferably the main support includes a counterweight for approximately offsetting the weight of the extended slide and carrying fixture, and a carcass carried thereon, which weight is outboard to one side of the headstock spindle and its bearings.

In operation, the transfer of the carcass from the ready or supply position (as at the delivery station of a carcass building apparatus) to the tire building drum is accomplished with a series of simple linear and arcuate motions which can be precisely controlled with a high degree of repeatability. The main support is rotated by the headstock spindle, which may be driven, for example, by a stepping motor, to just three positions. These position are related to the location of the extension slide about the main support and the headstock spindle axis, and may be described as 0 degrees, where the extension slide extends vertically upward from the main support, +90 degrees where the extension slide projects outward from the main support toward the ready position at the carcass building apparatus, and +270 degrees where the slide extends outward from the main support and toward the tire assembly drum. The headstock is moved parallel to the tire building drum by movement of the headstock carriage. The extension slide extends and retracts, away from and toward the main support, under control of a stepping motor driven mechanism which can be programmed to position the carrying fixture at a precise distance from the headstock spindle axis. The gripping arms of the fixture can be closed to the ends of a carcass, and opened to release from a carcass, by motorized controls, and the spacing between the sets of gripping arms can also be adjusted by a motorized control, so as to accommodate the carrying fixture to different sizes, both length-wise and diametrically, of cylindrical carcasses.

When assembly of the carcass is complete, the carcass is located at a ready station, adjacent the transfer robot. In an embodiment where the robot functions with an automated carcass building apparatus this is accomplished by moving a carcass building drum, with a completed carcass thereon, to a carcass supply or delivery station, opposite the carrying fixture of the transfer robot. The gripping arms are extended to engage with the bead areas of the cylindrical carcass. The carcass building drum releases from the carcass, and moves out of the carcass.

Then, the robot mechanism simply swings the carcass, engaged by the arms, through an arc of about 180 degrees by rotating the main support, so the centerline of the carcass is in general alignment with the rotational axis of the tire building drum. The headstock carriage then moves the gripping arms coaxially with the tire assembly drum until the carcass is sufficiently around the drum, whereupon the gripping arms are separated to release from the carcass and the extension slide retracts the carrying fixture away from the carcass, and the mechanism of the transfer robot retreats to a waiting or ready position, for a command to fetch the next carcass.

Thus, the principle object of the invention is to provide a transfer apparatus, e.g. a robot, for tire carcasses, including a main support mounted to a selectively rotatable headstock spindle, an extension slide mounted to the main support and extendable to one side thereof, and a carrying fixture mounted to the extension slide and having adjustable sets of spaced apart gripping arms for gripping and carrying a tire carcass; to provide a novel method for the handling and loading of tire carcasses onto a tire building drum; to provide such an apparatus wherein the transferring motions of the gripping arms are linear and rotary, and capable of repetition to close tolerance; to provide such an apparatus in which the extension slide and carrying fixture is counterweighted, particularly when carrying a tire carcass, to reduce offset loads on support bearings and drives, and to promote smooth and rapid functioning of the apparatus; and to provide such an apparatus which is quickly programmable to handle different sizes of tire carcasses.

Other objects and advantages of the invention will be apparent from the following description, the accompanying drawings, and the appended claims.

DESCRIPTION OF THE DRAWINGS

FIG. 1 is a pictorial perspective view of the mechanism of the carrying fixture of a transfer robot constructed in accordance with the present invention, as seen from the right of FIG. 2;

FIG. 2 is a similar perspective view, taken from the left of FIG. 1, showing the main support, the carrying fixture and its adjustable gripping arms;

FIGS. 3, 4 and 5 are schematic representations of the transfer robot apparatus and its successive motions in performing a tire carcass transfer operation; and FIG. 6 is an enlarged detail view from above of one of the gripping fingers on the robot arms, which engage the bead areas of the carcass.

DESCRIPTION OF THE PREFERRED EMBODIMENT

FIGS. 3, 4 and 5 show the basic elements of a transfer robot for transferring a cylindrical tire carcass TC from a ready station, shown as the outline of a carcass building drum 10, to a tire building or assembly drum shown in outline at 12. The transfer apparatus or robot is mounted between these two locations, and comprises a conventional headstock 14 having a spindle or shaft 15 which is rotated by a suitable motor (not shown), preferably a stepping motor or equivalent which can cause rotation of spindle 15 through precise rotational motion of less than a full circle. In the preferred embodiment, spindle rotations of 90° and 180° are used. Headstock 14 is supported on a carriage 16 which operates on a bed or track 17 extending parallel to the longitudinal axis 12A of building drum 12. This carriage may be moved in a programmed fashion by a servomotor positioner (not shown) driving carriage 16 through a conventional ball-screw drive.

Fixed to spindle 15 and rotated by it is a main support member in the form of a semicircular support disk 18 having an elongated transverse mounting slot or guide 20 which extends across the face of disk 18, preferably intersecting the axis of rotation of spindle 15. Mounted in guide 20, movable therealong, is a support slide 22 having an outer end 25 supporting a generally perpendicularly extending carrying fixture 30. The enlarged portion 27 of support disk 18 functions as a counterweight to offset partially the forces on the support bearings of spindle 15 due to the outboard weight of slide 22, particularly when it is extended, and the fixture or cradle 30, as well as the weight of a carcass TC.

The mounting fixture 30 includes a pair of spaced apart sleeve-like cylindrical support members 32 into which are fitted parallel support rods 34. Slidably mounted on support rods 34 are upper and lower arm supports 36 and 38 which extend between rods 34 and each of which carries spaced apart gripping arms 40 and 42, respectively.

As shown in FIG. 3, support disk 18 is rotated until slide 22 is aligned with a carcass TC at the carcass supply position, and the fixture 30 is adjacent the carcass. Then slide 22 is extended until gripping arms 40 and 42 are located adjacent the top and bottom of the carcass, respectively, spaced slightly outward of the ends or bead areas of the carcass, and the gripping arms are then closed toward the diameter of the carcass. At this point, the carrying fixture 30 is located forward of building drum 12.

The arms 40, 42 are moved longitudinally inward to the ends of the carcass, and gripping fingers 40A and 40B engage the ends of the carcass at diametrically opposed locations (FIG. 6). Then, spindle 15 is rotated through 180° (counterclockwise as seen in FIG. 3) as indicated by the arcuate arrow, until the center of carcass TC is located on the centerline (e.g. the longitudinal rotational axis) of building drum 12, forward of that drum.

The headstock carriage 16 then moves in a direction such that the carcass is carried into a position concentrically around building drum 12, whereupon the carriage halts, the arms 40, 42 are separated to release the bead areas of the carcass, leaving it resting on the building drum, and slide 22 retracts toward support disk 18. This moves the fixture 30 away from the building drum, after which the spindle rotates 90° clockwise to move the fixture to a parked position, with arms 40, 42 extending upward as shown in phantom lines in FIG. 5. Carriage 16 then moves in the opposite direction until support disk 18 and slide 22 are again opposite the carcass supply position, to await a signal to fetch another carcass from the carcass supply station 10.

Thus, the motions to achieve a full transfer of one carcass are linear motions of slide 22, arms 40, 42, and carriage 16, and rotary swinging motion of support disk 18, all of which may easily be programmed. Despite the weights involved, such motions can be accurately defined and controlled with guides and bearings which are conventional, thus the motions of this apparatus are repeatable with a high degree of accuracy.

This operation is of particular advantage when used with a novel tire assembly drum having retractable bead-engaging pads and seal rings which can be moved between retracted positions essentially flush with that drum's surface, and extended (radially outward) positions in which the pads and seals engage and seal the bead areas of the carcass. Such an assembly drum is d in copending U.S. patent application Ser. No. 529,037, filed of even date with this application.

Referring to FIGS. 1 and 2, further details of the transfer robot are illustrated, particularly the structure of an actual embodiment of the carrying fixture 30. The supports 36 and 38 are generally complementary, and include upper and lower cross-beams 45 each having linear bearings 47 surrounding and movable along rods 34, and each cross-beam includes a horizontally extending track or slide 48. Arms 40 and 42 have carriage parts 50 at one end, engaged with the tracks 48 and forming a cantilever support for the outwardly extending gripping arms. This arrangement allows motion of the supports toward and away from each other to open and close the space between the arms in which the carcass is located during transfer, and also allows horizontal adjusting motion of the arms with respect to each other.

The open-close motion of the arms 40, 42 is controlled by a stepping or servo motor 55 which rotates a pinion gear 56 centrally mounted to the following fixture between the rods 34, as shown in FIG. 1. Pinion 56 meshes with a pair of racks 58, extending on opposite sides thereof, and fastened to between the upper and lower cross-beams 45, 46. Appropriate rotation of the pinion 55 will thus move the arm supports 36 and 38 equally and toward or away from each other.

The in-out adjusting motion of arms 40, 42 is controlled by threaded rod 60 which extend along cross-beams 45, 46, and supported in bearing boxes 62. Each rod has oppositely threaded ends 60A and 60B extending from the bearing boxes and meshing with follower nuts (not shown) in the arm carriage parts 50. Thus rotation of the rods 60 will cause inward-outward motion of the arms 40, 42. Rods 60 are reversibly driven, and mechanically connected, by right angle drives 64, each mounted at one end of the cross-beams 45, 46, and having a driving spline connection to a vertically arranged drive shaft 65, which in turn is supported by a bearing 66 mounted to an extension of one of the fixture support members 32, as seen in FIG. 1.

A driving pulley 68 is fixed to shaft 65, and is reversibly rotated by a stepping motor 70 or the like connected to pulley 68 by a toothed belt 72. By controlling the rotation of motor 70, the arms 40, 42 can thus be positioned sideways of the fixture 30 to accommodate carcass of different size.

The actuators for producing this motion are controlled by servo motors 52 and 55 which can respond to programmable digital controllers to cause automated opening-closing movement of the clamp or gripping arms 40, 42 to grasp a cylindrical carcass assembly, regardless of differing sizes thereof being built. The robotic head is supported on carriage 16 which has straightforward linear motion parallel to the other beds, also under programmable servomotor control, and rotary movements which enable it to swing the extensible arms and perform this function efficiently without complicated mechanism and/or movement. This contributes to precise, repeatable, transfer motions with long term low maintenance and reliability.

While the method and form of apparatus herein described constitutes a preferred embodiment of this invention, it is to be understood that the invention is not limited to this precise method and form of apparatus, and that changes may be made therein without departing from the scope of the invention which is defined in the appended claims.

What is claimed is:

1. A transfer robot used in combination with a first stage carcass supply station and a second stage tire building drum for carrying a cylindrical tire carcass from a first position located on the carcass supply station to a second position located on the tire building drum, the combination comprising:

a tire building drum mounted such that its axis of rotation is horizontal, said drum having an end over which a carcass can be loaded onto said drum;

a carcass supply station supplying cylindrical tire carcasses having bead areas at their ends, wherein each said carcass is supplied with its longitudinal axis horizontal and in predetermined alignment with the axis of rotation of the tire building drum;

a robot located between the carcass supply station and the tire building drum; said robot comprising, a track means extending parallel with the axis of rotation of said tire building drum, a carriage movable along said track means, a headstock mounted on said carriage, a rotatable spindle supported in said headstock on an axis of rotation parallel with the axis of rotation of said tire building drum, a main support member attached to and rotatable with said spindle, a guide extending outwardly on said main support member to one side of said spindle, slide means movable along said guide toward and away from the axis of rotation of said spindle, a carcass carrying fixture connected to said slide means, gripping means on said fixture for gripping a carcass at its bead areas, said gripping means comprising two sets of opposing gripping arms and means supporting said gripping arms for movement toward and away from each other to grip or release a carcass, means for rotating said spindle to swing said gripping means with a carcass therein from the first position to a position axially displaced from and coaxial with said tire building drum, means for moving said carriage to carry a carcass so aligned with said tire building drum along the axis of rotation of said drum over said end of said drum and into the second position around said drum, and means for releasing said gripping means from the carcass at the second position and retracting said gripping means toward said spindle leaving the carcass deposited on said tire building drum.

2. The combination defined in claim 1, further including counterbalance means incorporated in said support member for counterbalancing the extended carrying fixture and a carcass gripped therein.

3. The combination defined in claim 1, further including means for adjusting the spatial distance between said sets of gripping arms.

* * * * *